United States Patent [19]
Norton et al.

[11] 3,825,068
[45] July 23, 1974

[54] CARBOXY VINYL POLYMER AND SULFONATED ALKYL ACRYLAMIDE POLYMER MOBILITY CONTROL AGENT AND PROCESS

[75] Inventors: Charles J. Norton; David O. Falk, both of Denver, Colo.

[73] Assignee: Marathon Oil Company, Findlay, Ohio

[22] Filed: Mar. 27, 1972

[21] Appl. No.: 238,142

[52] U.S. Cl.......... 166/305 R, 166/275, 252/8.55 D
[51] Int. Cl............................................ E21b 43/16
[58] Field of Search........ 166/275, 274, 273, 305 R; 252/8.55 D

[56] References Cited
UNITED STATES PATENTS

| | | | |
|---|---|---|---|
| 2,798,053 | 7/1957 | Brown | 252/89 X |
| 3,679,000 | 7/1972 | Kaufman | 166/275 X |

Primary Examiner—Ernest R. Purser
Assistant Examiner—Jack E. Ebel
Attorney, Agent, or Firm—Richard C. Willson, Jr.; Joseph C. Herring; Jack L. Hummel

[57] ABSTRACT

Carboxy vinyl polymer (CVP) (Carbopol 961) when dissolved with sulfonated alkyl acrylamide polymer, increases screen factor and provides enhanced supplemented recovery of oil.

5 Claims, 2 Drawing Figures

THE THICKENER SYSTEM CVP-SAAP
SHOWS SYNERGISM

THE THICKENER SYSTEM CVP-SAAP SHOWS SCREEN FACTOR SYNERGISM

CARBOXY VINYL POLYMER AND SULFONATED ALKYL ACRYLAMIDE POLYMER MOBILITY CONTROL AGENT AND PROCESS

CROSS REFERENCES TO RELATED APPLICATIONS

The following cases relate to the same general field as that of the present invention:

U.S. Pat. Nos. 3,507,331 and 3,467,187; Ser. No. 74,336 filed Sept. 22, 1970 now U.S. Pat. No. 3,677,344; Ser. No. 76,140 filed Sept. 28, 1970 now U.S. Pat. No. 3,724,545; Ser. No. 67,726 filed Aug. 28, 1970 now U.S. Pat. No. 3,670,820; Ser. No. 79,591 filed Oct. 9, 1970 now U.S. Pat. No. 3,692,113; Ser. No. 85,064 filed Oct. 29, 1970 now U.S. Pat. No. 3,684,014; Ser. No. 126,731 filed Mar. 22, 1971 pending; Ser. No. 133,060 filed Apr. 12, 1971 now U.S. Pat. No. 3,746,094; Ser. No. 140,931 filed May 6, 1971 allowed; Ser. No. 209,479 filed Nov. 26, 1971 allowed; Ser. No. 238,143 filed Mar. 24, 1972; Ser. No. 220,910 filed Jan. 26, 1972.

BACKGROUND OF THE INVENTION

1. Field of the Invention

The present invention relates primarily to wells classified in Class 166 of the United States Patent Office, and more particularly to production of earth fluid by driving fluid classified in Class 166 subclass 252.

2. escription of the Prior Art

The preparation of acrylamidoalkane-sulfonic acid monomer is disclosed in Lubrizol Corporation's U. S. Pat. No. 3,506,707. N-sulfohydrocarbon-substituted acrylamide polymers as viscosity increasing agents for secondary oil recovery are disclosed in Lubrizol Corporation's Canadian Patent 864,434.

Carboxy vinyl polymers, (CVP), e.g., B. F. Goodrich Chemical Company's Carbopol, (described in their Service Bulletin GC–36) have been used as viscosity-increasing agents in secondary recovery operations. However, the present invention embodies the discovery that a combination of two agents provides unexpected increase in the efficiency of petroleum recovery, substantially above that which would be expected from an examination of data on the use of either of the polymers alone. The prior art discussed in the aforementioned related applications also has applicability to the general field of the present invention.

A design criterion for an optimum flooding process is to have the mobility of the displacing fluid about equal to or less than that of the combination of the formation fluids (hydrocarbon and interstitial water) within the reservoir. This has usually been accomplished by injecting into the water flood a single agent to effect a reduction in mobility.

SUMMARY OF THE INVENTION

This invention relates to a method of improving mobility control of a flooding process by injecting an aqueous solution of CVP and sulfonated alkyl acrylamide polymer (SAAP) into the oil bearing formation. The result of the injection of this aqueous solution is a substantial increase in the screen factor property and also the production of petroleum from subterranean formations.

DESCRIPTION OF THE PREFERRED EMBODIMENTS

Starting Materials:

By "CVP" or carboxy vinyl polymer, is meant herein water soluble high molecular weight polymers containing predominantly carboxy vinyl monomer units which can be produced according to the techniques of U.S. Pat. No. 2,798,053, without substantial comonomers.

By "sulfonated alkyl acrylamide polymer" is meant herein high molecular weight polymers containing predominantly sulfonated alkyl acrylamide monomer units.

The SAAP will preferably have molecular weights in the range above $0.1 \times 10^6$, preferably from 0.5 to $40 \times 10^6$, more preferably from $1 \times 10^6$ to $15 \times 10^6$, and most preferably from $3 \times 10^6$ to $10 \times 10^6$. Preferably the SAAP will be present in amounts of from about 0.001 to about 10.0, more preferably from 0.01 to about 1.0, and most preferably from 0.02 to about 0.2 weight percent based on the weight of the total solution.

The CVP will preferably have molecular weights above $0.1 \times 10^6$, preferably 0.5 to about $20 \times 10^6$, more preferably from 1 to about $15 \times 10^6$, and most preferably from $3 \times 10^6$ to about $10 \times 10^6$.

Preferably, the CVP will be present in amounts from about 0.001 to about 10, more preferably from 0.01 to about 1.0, and most preferably from 0.02 to about 0.2 weight percent based on the total solution.

The solvent for the liquid solutions of the present invention are comprised of water, most preferably consist essentially of connate water, for example, Palestine line water, fresh water, or brackish water. It is preferable that the water contain less than about 300,000, more preferably less than about 10,000, and most preferably less than about 500 parts per million of dissolved solids. The resulting aqueous solution of CVP and SAAP will preferably have viscosity of from about 1.5 to about 1,000 cps, more preferably from about 5 to about 500 cps, and most preferably from 10 to about 100 cps.

While not necessary to the practice of the present invention, various other ingredients including among others, cellulose derivatives and surfactants, e.g., polyalkyl aryl sulfonate and other conventional displacement fluid additives may be added to the liquid polymer solutions.

Preparation of Liquid Systems:

It will generally be preferable to merely co-mix CVP and the SAAP and then add water while gently stirring to promote dispersion, suspension, and solution. Bubbling a small amount of non-reactive gas, e.g., natural gas, may be used to effect mild stirring. The ingredients will preferably be mixed at an ambient temperature somewhat above room temperature, more preferably from 0°C. to about 100°C., and most preferably from 20°C. to about 50°C. If desired, a mixing operation can be employed in one or more full-type mixers or mixing tees so long as the proportions of the ingredients are properly measured and thoroughly mixed. Bactericides and antioxidants can be advantageously added to preserve the viscosity of the solution.

Figure 2:
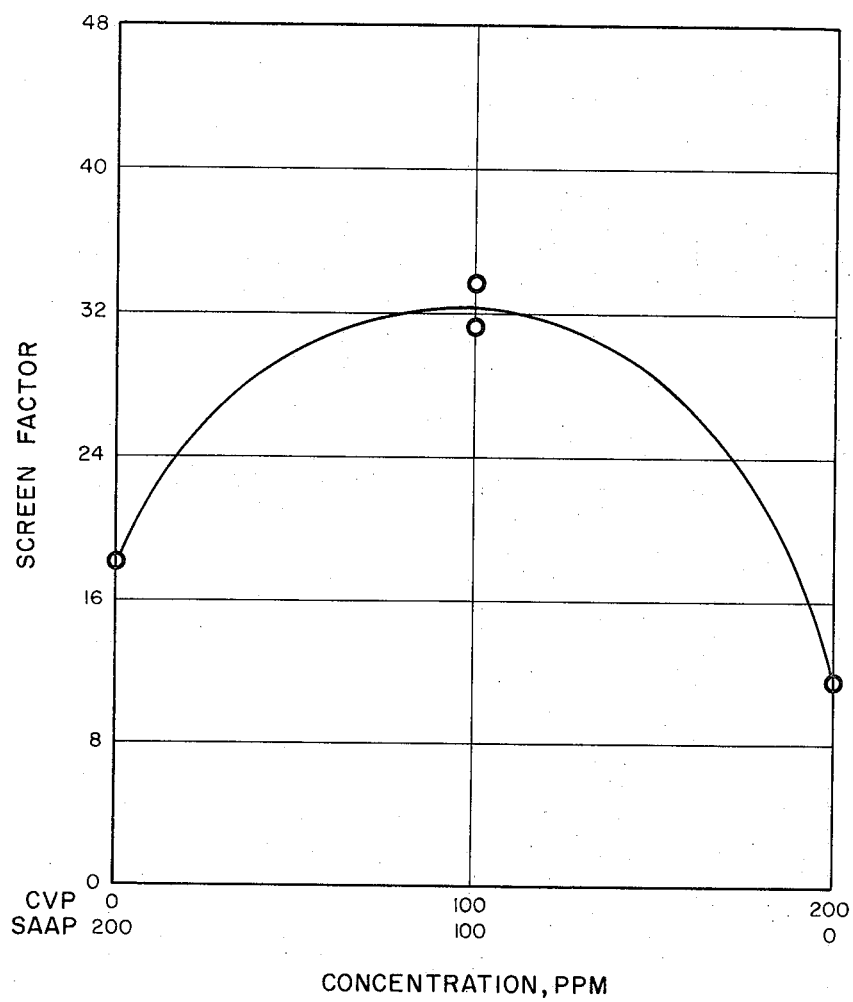
FIG. 2 shows the unexpected synergistic improvement in screen factor that is obtained with a thickener formulation comprised of 50 CVP and 50 percent SAAP (Lubrizol polymer) used to push a 0.03 pore volume of surfactant slug.

Screen Factor:

Aqueous solutions of carboxy vinyl polymer and SAAP are prepared by weighing both solids into a bottle, adding deionized water, stirring slowly with a magnetic bar for several hours until visibly dissolved, and then allowing to stand for one day. Testing for "screen factor" is done according to Society of Petroleum Engineers Paper No. 2867, and the test results are summarized in FIG. 2.

EXAMPLES I–IV

Examples I through IV are run under identical conditions. artificial

A 3 inch diameter by 4 foot Berea sandstone cylindrical core is prepared to simulate a condition at the termination of a preliminary secondary water-flood operation. This condition is achieved by first saturating the core with artificial Henry field water, then partially displacing this water with Henry field crude oil until saturated with crude ($O_i$, $W_i$), and finally water flooding with artiticial Henry water to residual oil ($O_r$) and residual water ($W_r$) saturations.

The comparabilities of the examples employing various thickeners in supplemented recovery operations are established by the preliminary data on pore volumes (PV), porosities, permeabilities (md), initial oil and water saturations ($O_i$, $W_i$) residual oil and water saturations ($O_r$ and $W_r$) after preparation simulated water flood with a typical Henry field plant water, and similar efficiencies of water flood recovery (Eff).

In all experiments supplemental floods a 0.03 PV slug of a petroleum sulfonate (FF–561) was pushed in the secondary flooding operation by up to about 1 PV of the particular thickened water. In each example the injection of thickened water was continued to the point at which no additional oil was recovered. The data are summarized in Table 1, the last column of which lists the percent oil recovery based on residual oil remaining after the preliminary water flood.

Figure 1:
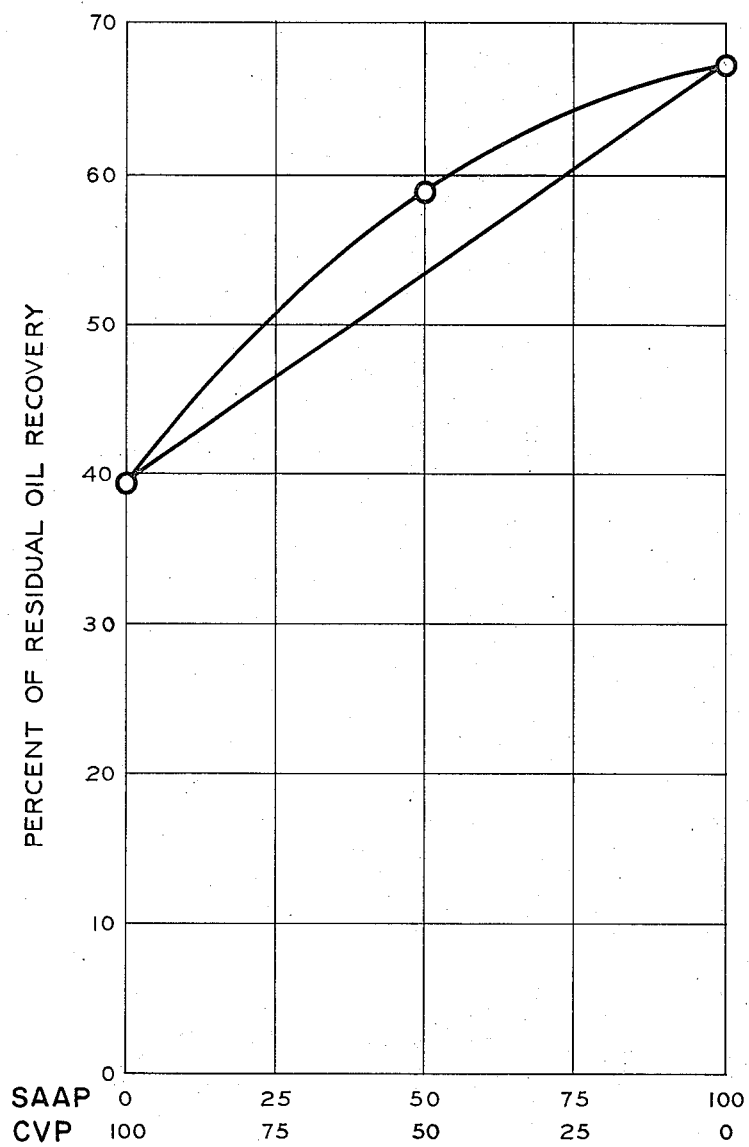
FIG. 1 compares the supplemented oil recoveries obtained at various compositions of thickener, all used at 500 ppm concentration. The magnitude of the synergism attained with (SAAP) (Lubrizol polymer) in combination with CVP is indicated by the area between the two curves.

The synergistic effect of thickened water prepared from mixed compositions of SAAP and CVP on oil recovery are illustrated on FIG. 1.

TABLE 1.—SUMMARY OF THICKENED WATER SUPPLEMENTED RECOVERIES [1]

| Example Number | Run Number | PV, cc. | Porosity, percent | Permeability, md. | Percent of— | | | | | Total thickened water recovery | | |
|---|---|---|---|---|---|---|---|---|---|---|---|---|
| | | | | | $O_i$ | $W_i$ | $O_s$ | $W_s$ | Eff. | Thickner | PV | Percent of $O_r$ |
| I | 08104 | 1,098 | 21.3 | 784.0 | 62.7 | 37.3 | 37.3 | 62.7 | 40.5 | 500 p.p.m. Lubrizol polymer | 1.04 | 66.7 |
| II | 09138 | 1,013 | 19.7 | 927.1 | 68.8 | 31.2 | 39.8 | 60.2 | 42.2 | 500 p.p.m. Lubrizol polymer (repeat experiment). | 1.06 | 67.8 |
| III | 09139 | 1,094 | 21.2 | 702.7 | 62.5 | 37.5 | 36.4 | 63.6 | 41.8 | 250 p.p.m. carboxy vinyl polymer, 250 p.p.m. lubrizol polymer. | 0.99 | 58.9 |
| IV | 09137 | 1,092 | 21.2 | 780.4 | 62.5 | 37.5 | 36.3 | 63.7 | 41.9 | 500 p.p.m. carboxy vinyl polymer | 1.02 | 39.5 |

[1] 3 in. diameter by 4 ft. long Berea sandstone (fired at 825° F.) was first saturated with artificial Henry plant brine (containing 11,000 p.p.m. Cl⁻, 6,500 p.p.m. Na⁺, 276 p.p.m. Ca⁺⁺, 167 p.p.m. Mg⁺⁺) and Henry Crude to an initial oil saturation ($O_i$) and initial water saturation ($W_i$); the core was subsequently flooded to residual saturation ($O_r$ and $W_r$) and then flood at rates of 1.9 to 3.7 ft./day with 0.03 PV of FF–561 slug (petroleum sulfonate slug) followed by up to 1 pore volume of synthetic "Palestine Water" (containing 400 p.p.m. NaCl and 55 p.p.m. CaCl₂) and the additional crude recovered and calculated as percent of residual oil in the core before this final flood.

MODIFICATIONS OF THE INVENTION

It will be understood by those skilled in the art that the relative proportions of the admixture of CVP and SAAP utilized in the examples herein are merely exemplary of the relative proportions which may be employed with the present invention. For example, using nearly 100 percent CVP at the leading edge of the displacement slug and gradually using a higher and higher percentage of SAAP, to provide a slug which is rich at its leading edge where depletion is most likely to occur. Initial viscosity of the slug may be the same at all points throughout the slug or may be itself gradually decreased until it approaches that of the drive fluid which displaces the slug through the formation.

What is claimed is:

1. A process for the displacement of oil in an oil-bearing formation comprising injecting into said formation an aqueous solution comprised of about 0.001 to about 10 percent by weight of a water-soluble sulfonated alkyl acrylamide polymer and about 0.001 to about 10 weight percent water-soluble carboxy vinyl polymer based on the weight of the total solution, wherein said carboxy vinyl polymer is substantially a homopolymer.

2. Process according to claim 1 wherein the aqueous solution is characterized by a viscosity of from about 1.5 to about 1,000 centipoises.

3. Process according to claim 2 wherein the aqueous solution is characterized by a viscosity of from about 5 to about 500 centipoises.

4. Process according to claim 2 wherein the aqueous solution is characterized by a viscosity of from about 10 to about 100 centipoises.

5. Process according to claim 1 wherein the carboxy vinyl polymer has a molecular weight above 100,000.

\* \* \* \* \*

UNITED STATES PATENT OFFICE
CERTIFICATE OF CORRECTION

Patent No. 3,825,068     Dated 7/23/74

Inventor(s) CHARLES J. NORTON ET AL

It is certified that error appears in the above-identified patent and that said Letters Patent are hereby corrected as shown below:

Col. 2, line 11:     Delete "50 CVP" and insert --50 percent CVP--.

Col. 3-4, Table 1:
In headings:     Delete $\frac{\text{Percent of}}{O^1 \quad W_i \quad O_s \quad W_s}$ "

and insert therefor:

-- $\frac{\text{Percent of}}{O^1 \quad W_i \quad O_r \quad W_r}$ --.

Col. 3, line 35:     Delete " artificial" after "conditions".

Signed and Sealed this

Sixth Day of September 1977

[SEAL]

Attest:

RUTH C. MASON
Attesting Officer

LUTRELLE F. PARKER
Acting Commissioner of Patents and Trademarks